(12) United States Patent
Carrier et al.

(10) Patent No.: US 11,029,531 B2
(45) Date of Patent: Jun. 8, 2021

(54) EYEGLASS FRAME LENS LOCK

(71) Applicant: Amanda Carrier, Dallas, TX (US)

(72) Inventors: Robert Carrier, Dallas, TX (US);
Amanda Carrier, Dallas, TX (US);
Brad Grunwald, Garland, TX (US);
Steven Mollerberg, Dallas, TX (US)

(73) Assignee: Amanda Carrier, Dallas, TX (US)

(*) Notice: Subject to any disclaimer, the term of this patent is extended or adjusted under 35 U.S.C. 154(b) by 188 days.

(21) Appl. No.: 16/278,306

(22) Filed: Feb. 18, 2019

(65) Prior Publication Data
US 2020/0264446 A1   Aug. 20, 2020

(51) Int. Cl.
| | |
|---|---|
| *G02C 5/22* | (2006.01) |
| *G02C 1/06* | (2006.01) |
| *G02C 5/14* | (2006.01) |
| G02C 1/00 | (2006.01) |
| G02C 5/00 | (2006.01) |

(52) U.S. Cl.
CPC .............. *G02C 1/06* (2013.01); *G02C 5/14* (2013.01); *G02C 5/22* (2013.01); *G02C 1/10* (2013.01); *G02C 5/008* (2013.01); *G02C 2200/08* (2013.01)

(58) Field of Classification Search
CPC .. G02C 2200/08; G02C 1/08; G02C 2200/06; G02C 5/22; G02C 5/14; G02C 5/2272; G02C 9/04
USPC ........... 351/90–102, 116, 113, 111, 115, 119
See application file for complete search history.

(56) References Cited

U.S. PATENT DOCUMENTS

| | | | |
|---|---|---|---|
| 1,922,766 | A | 8/1933 | Hurwitz |
| 5,048,944 | A | 9/1991 | Porsche |
| 5,325,132 | A | 6/1994 | Mulrine et al. |
| 5,428,410 | A | 6/1995 | Lei |
| 5,455,639 | A | 10/1995 | Magdelaine et al. |
| 5,587,747 | A | 12/1996 | Bernheiser |
| 5,900,922 | A | 5/1999 | Moore |
| 6,533,412 | B1 | 3/2003 | Wang et al. |
| 6,712,465 | B1 | 3/2004 | Teng |

(Continued)

FOREIGN PATENT DOCUMENTS

| | | |
|---|---|---|
| DE | 20101580 U1 | 9/2001 |
| JP | 2001133731 A | 5/2001 |

(Continued)

OTHER PUBLICATIONS

Foreign Communication from a Related Counterpart Application, International Search Report and Written Opinion dated May 29, 2020, International Application No. PCT/US2020/018517 filed on Feb. 17, 2020.

*Primary Examiner* — Hung X Dang

(57) ABSTRACT

An eyeglass frame is disclosed comprising a bridge and two rims connected by the bridge. Each rim is configured to contain a lens. The eyeglass frame also comprises two split end pieces. Each split end piece comprises a first portion and a second portion. Each split end piece is coupled to and extends outward from a corresponding rim of the two rims on a side of the corresponding rim opposite the bridge. The eyeglass frame further comprises two temples. Each temple comprises a lock on an end of the temple. The lock is configured to at least partially contain both the first portion and the second portion of the split end piece and secure the temple to the corresponding rim and secure the lens within the corresponding rim.

13 Claims, 15 Drawing Sheets

(56) References Cited

U.S. PATENT DOCUMENTS

| | | |
|---|---|---|
| 6,969,172 B2 | 11/2005 | Actis-Datta |
| 7,097,299 B2 | 8/2006 | Zelman |
| 7,497,569 B2 | 3/2009 | Webb |
| 7,537,336 B2 | 5/2009 | Zelman |
| 7,712,894 B2 * | 5/2010 | Tsai .................. G02C 1/08 351/97 |
| 7,954,942 B2 | 6/2011 | Calilung et al. |
| 8,550,619 B2 | 10/2013 | Walker, Jr. et al. |
| 8,579,433 B2 | 11/2013 | Margolis |
| 8,668,330 B2 | 3/2014 | Reyes et al. |
| 9,081,213 B2 | 7/2015 | Weinberg |
| 9,104,043 B2 | 8/2015 | Crescenzi et al. |
| 9,256,080 B2 | 2/2016 | Earley |
| 9,632,330 B2 | 4/2017 | Damin et al. |
| 2006/0119789 A1 | 6/2006 | Bruck |
| 2015/0042948 A1 | 2/2015 | Chung |

FOREIGN PATENT DOCUMENTS

| | | |
|---|---|---|
| WO | 9001718 A1 | 2/1990 |
| WO | 2011137942 A1 | 11/2011 |
| WO | 2018167279 A1 | 9/2018 |
| WO | 2020172099 A | 8/2020 |

* cited by examiner

EYEGLASS FRAME LENS LOCK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Eyeglasses are typically worn to aid or correct vision and/or to protect the eyes, such as from sunlight. Eyeglasses may also be worn for cosmetic reasons or as a fashion accessory.

SUMMARY

In an embodiment, an eyeglass frame is disclosed. The eyeglass frame comprises a bridge and two rims connected by the bridge. Each rim is configured to contain a lens. The eyeglass frame also comprises two split end pieces. Each split end piece comprises a first portion and a second portion. Each split end piece is coupled to and extends outward from a corresponding rim of the two rims on a side of the corresponding rim opposite the bridge. The eyeglass frame further comprises two temples. Each temple comprises a lock on an end of the temple. The lock is configured to at least partially contain both the first portion and the second portion of the split end piece and secure the temple to the corresponding rim and secure the lens within the corresponding rim.

In another embodiment, a method for removing a lens from an eyeglass frame is disclosed. The method comprises disengaging an end piece on a rim of the eyeglass frame from within a lock on a temple of the eyeglass frame. The end piece comprises a split resulting in a first portion of the end piece and a second portion of the end piece. The method also comprises opening the rim at the split in the end piece by separating the first portion of the end piece from the second portion of the end piece and removing the lens from the rim.

In yet another embodiment, an eyeglass frame is disclosed. The eyeglass frame comprises a bridge and two rims connected by the bridge. Each rim is configured to contain a lens. The eyeglass frame also comprises two temples. Each temple is configured to couple to one of the two rims. The eyeglass frame additionally comprises two split pieces. Each split piece comprises a first portion and a second portion. Each split piece is coupled to and extends outward from a corresponding rim of the two rims on a same side of the corresponding rim as the bridge. The eyeglass frame further comprises at least one lock on the bridge. The at least one lock is configured to at least partially contain both the first portion and the second portion of at least one of the two split pieces and secure the lens within the corresponding rim.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
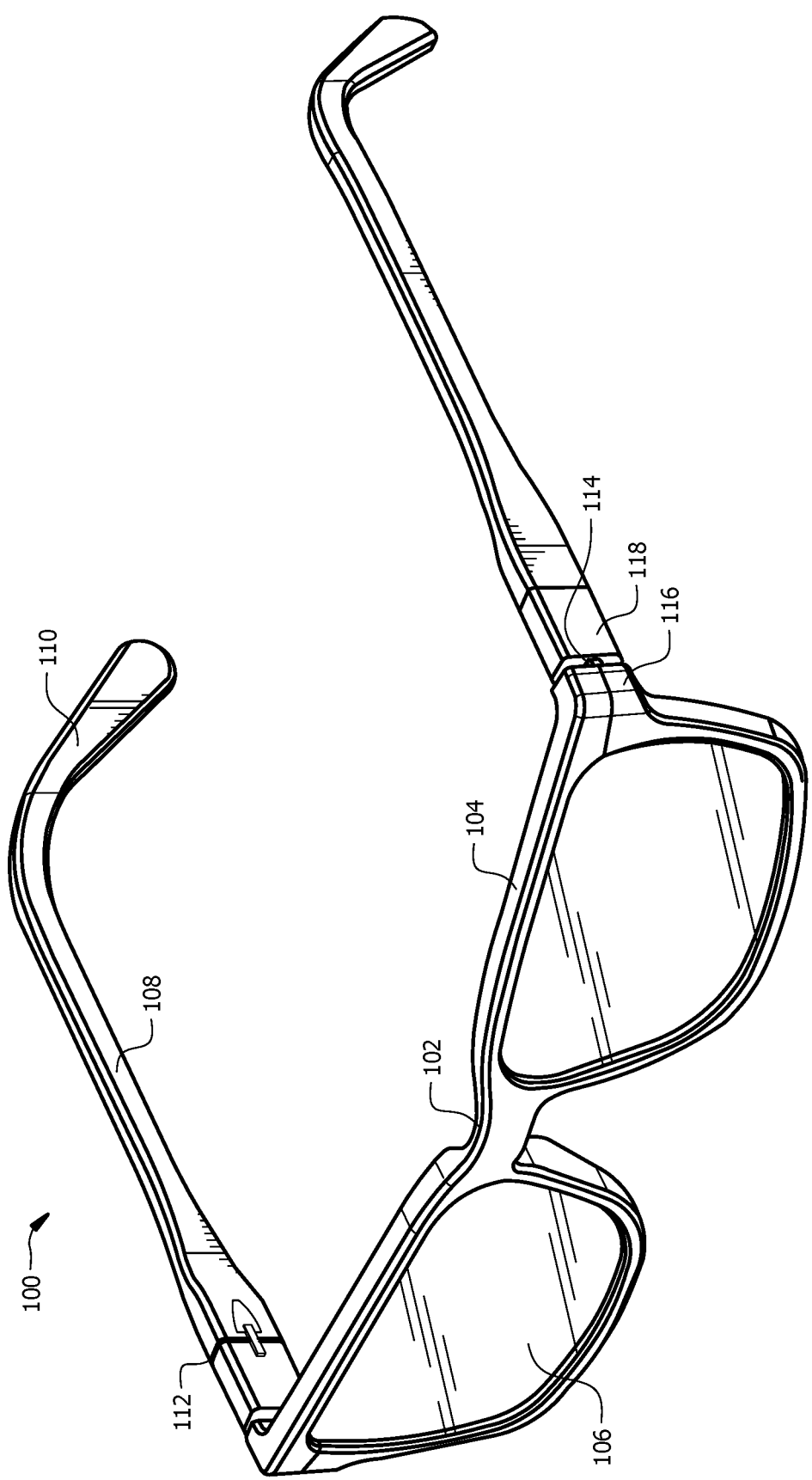
FIG. 1A is a perspective view of an eyeglass frame according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The pending disclosure is directed to an eyeglass frame lens lock that enables the lenses to removed and placed into a different eyeglass frame or the lenses to be removed and different lenses placed into the same eyeglass frame in an easier and more efficient way. For example, the eyeglass frame lens lock disclosed herein mechanically works to allow the removal of a lens with a simple manual action and without tools to release the lens. The eyeglass frame lock at least partially encloses or captures a portion of a split rim. The eyeglass frame lock closes the split rim to contain and secure the lens within the eyeglass frame.

In an embodiment, an eyeglass frame may comprise two eyeglass frame lens locks that each couple one temple to one split rim. In another embodiment, an eyeglass frame may comprise one or more eyeglass frame lens locks on the bridge of the eyeglass frame. For instance, the bridge of the eyeglass frame could form a single eyeglass frame lens lock that captures and constrains both split rims. In another example, the bridge of the eyeglass frame could comprise two eyeglass frame lens locks with each lock capturing and constraining one split rim and coupling the split rim to the bridge. In yet another example, an eyeglass frame may comprise two eyeglass frame lens locks elsewhere on the eyeglass frame as a decorative extension such as in corners of a cat eye style of eyeglass frames that each captures and closes a split rim to contain and secure the lens within the eyeglass frame and opens the split rim and releases the lens without requiring the use of tools.

The eyeglass frames discussed herein may be manufactured using one or more materials that are formable with a memory or resilience to elastically respond towards an original state even after being locked in a different state for a period of time to allow for easy removal of the lenses. For example, the split rims may be manufactured such that the rims naturally open at the split when the split rim is removed from the eyeglass frame lens lock.

The ability to easily release the lenses from within an eyeglass frame with only manual action using the disclosed eyeglass frame lens lock provides a number of different advantages and opportunities. For example, an eyeglass wearer could treat eyeglass frames as more of a fashion accessory by moving their lenses from one eyeglass frame to another eyeglass frame. For instance, an eyeglass wearer may want to wear a different color eyeglass frame based on their outfit choice for the day or may want to wear a different style eyeglass frame for a night out, and the eyeglass frame lens lock disclosed herein would allow them to easily remove the lenses from one eyeglass frame and place them in a different color or different style eyeglass frame. In another example, an eyeglass wearer may want to move their lenses from one eyeglass frame to another eyeglass frame for a more practical reason. For instance, an eyeglass wearer may want to wear a different style of eyeglasses for safety reasons, and the eyeglass frame lens lock disclosed herein would allow them to easily remove the lenses from one eyeglass frame and place them into a different, safety type eyeglass frame.

In addition to being able to remove lenses and place the lenses in a different eyeglass fame, the eyeglass frame lens lock disclosed herein also allows different lenses to be placed into the same eyeglass frame. For example, the eyeglass frame lens lock would enable an eyeglass wearer to remove and replace lenses having coatings and treatments that are optimized for indoor use from their eyeglass frames with lenses having coatings and treatments that are optimized for outdoor use when they are outside. In another example, the eyeglass frame lens lock would enable an eyeglass wearer to remove and replace lenses used for reading with lenses used for driving when they leave work to drive home.

Having the disclosed eyeglass frame lens locks located on the temples of the eyeglasses has a number of benefits. For example, such placement enables a seamless transition of the temples without needing to substantially change the look of the eyeglasses. The eyeglass frame lens locks and the placement of such locks at the temples may also strengthen the connection of the temples with the rims. Further, placing the hinges behind the eyeglass frame lens locks may help reduce the chances of damaging the eyeglass frame lens locks and the connection point of the rims and the locks due to bending of the temples at the hinge.

Figure 1B:
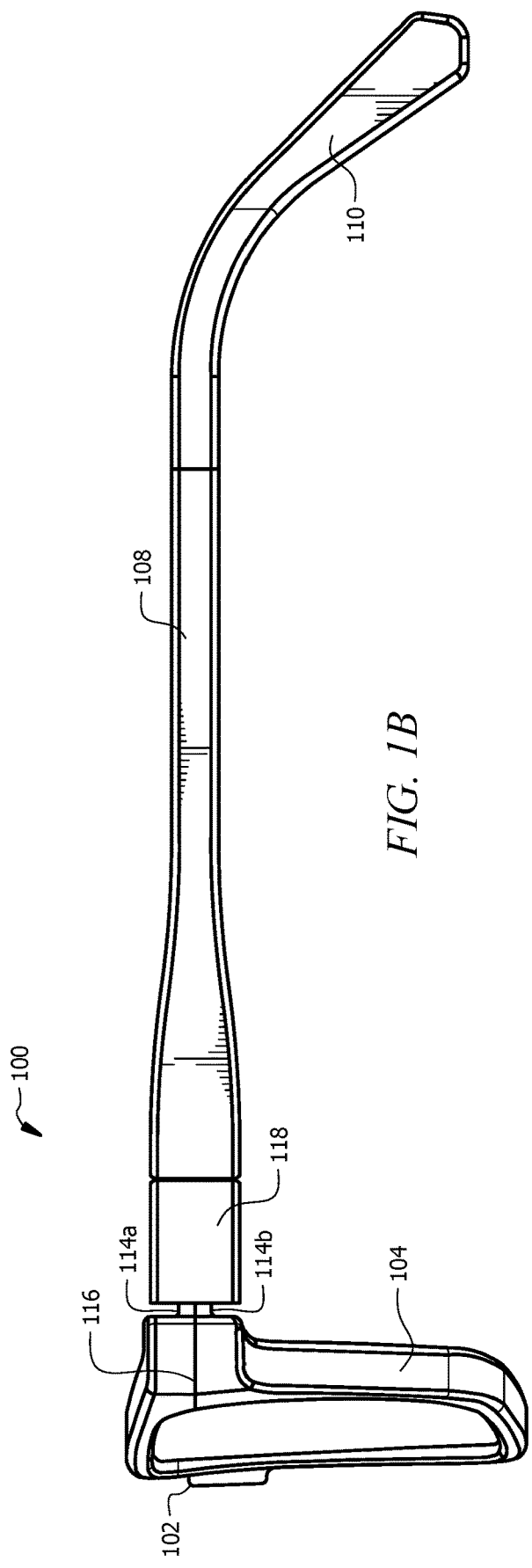
FIG. 1B is a side view of an eyeglass frame according to an embodiment of the disclosure.
Figure 1C:
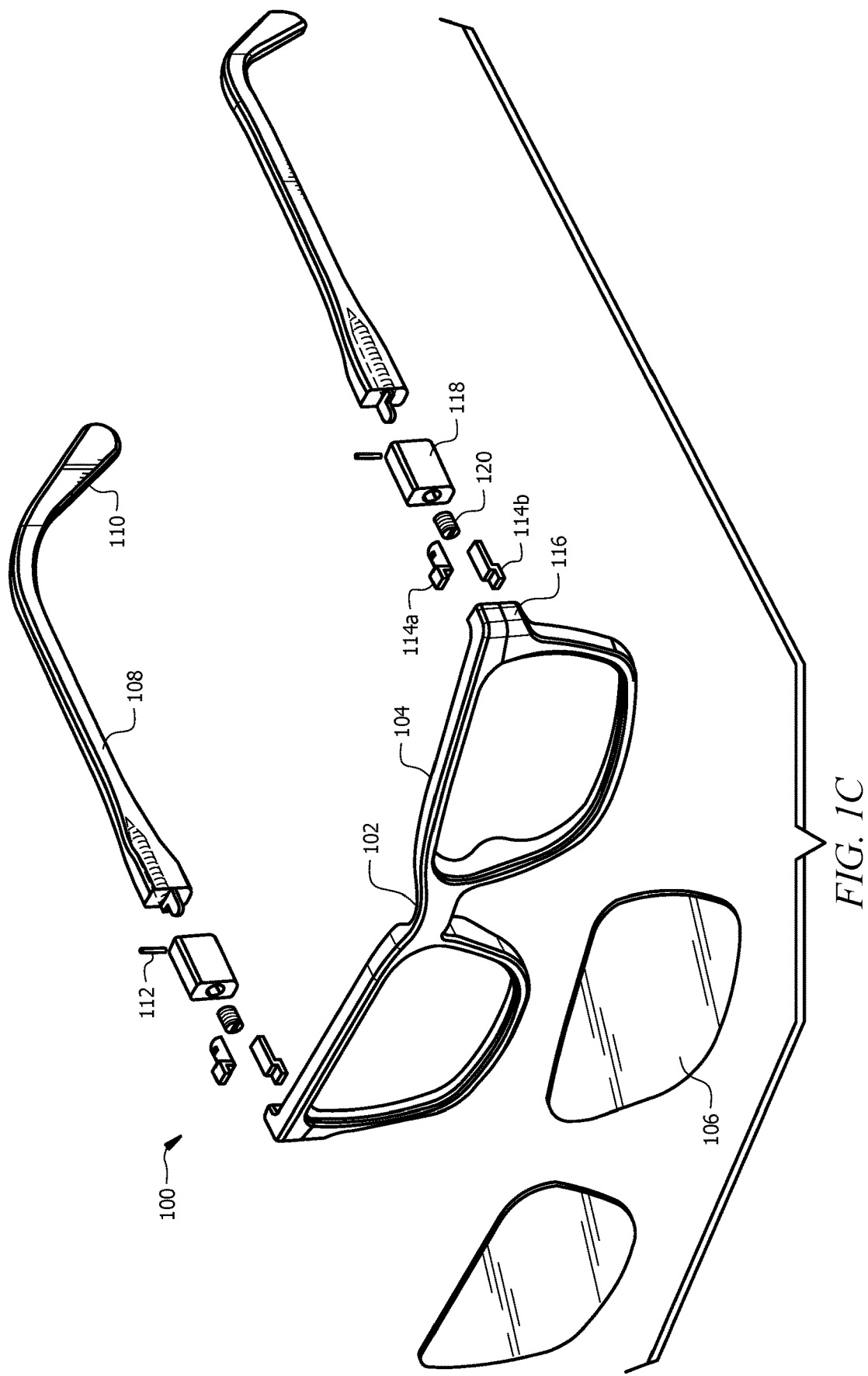
FIG. 1C is a perspective, exploded view of an eyeglass frame according to an embodiment of the disclosure.

Turning now to FIGS. 1A-1C, an embodiment of an eyeglass frame 100 is illustrated. The eyeglass frame 100 may be made out of plastic, metal, wood, 3D printing compounds, or a different material. In an embodiment, the eyeglass frame 100 comprises a bridge 102, two rims 104, two lenses 106, two temples 108, two earpieces 110, and two hinges 112. The bridge 102 may comprise an arched piece in a front center of the eyeglass frame 100. The bridge 102 may rest on a wearer's nose and connect the rims 104. Each of the rims 104 may be configured to contain or hold one of the lenses 106. In an embodiment, the rims 104 may be configured to rest on a wear's nose. In regard to shape, the rims 104 may be circular, oval, rectangular, square, or a different shape.

The lenses 106 may be clear or tinted material. The lenses 106 may be made of plastic, polycarbonate, or different material. The lenses 106 may be prescription lenses.

In an embodiment, the temples 108 comprise arms on the sides of the eyeglass frame 100 that extend from the hinges 112 and over the wearer's ears to keep the glasses on the wearer's face. The temples 108 may comprise the earpieces 110, which rest on and/or behind the wearer's ears. In an embodiment, the earpieces 110 comprise a cover over the end of the temples 108 to provide more comfort to the wearer. The hinges 112 may comprise a movable joint that allows the temples 108 to fold inward.

In an embodiment, the eyeglass frame 100 also comprises two split end pieces 114. Each split end piece 114 may be coupled to and extend outward from one of the rims 104 on a side of the rim 104 opposite the bridge 102. Each of the split end pieces 114 may comprise a first portion 114a and a second portion 114b. Each rim 104 on a side opposite the bridge 102 may comprise a horizontal split 116 to allow removal of the lens 106. In an embodiment, the first portion 114a of the split end piece 114 is coupled to the rim 104 on one side of the split 116 while the second portion 114b of the split end piece 114 is coupled to the rim 104 on the other side of the split 116. The split end pieces 114 may be formed together with the rims 104 as part of the manufacturing processes. Alternatively, the split end pieces 114 may be coupled to the rims 104 during or after the manufacturing process.

The eyeglass frame 100 may also comprise two locks 118. Each lock 118 may be located on an end of a temple 108 closest to the rims 104. In an embodiment, each lock 118 is configured to at least partially contain both the first portion 114a and the second portion 114b of the split end piece 114 and secure the temple 108 to the rim 104 and secure the lens 106 within the rim 104. The hinges 112 discussed above may be located at a back of the locks 118 closest to the earpieces 110 of the temples 108.

Each lock 118 may comprise a spring 120. In an embodiment, the spring 120 is a compression spring. In other embodiments, the spring 120 may be a different type of spring. The lock 118 will be discussed in more detail below with reference to FIGS. 3A and 3B.

In an alternative embodiment, rather than each lock being located on an end of a temple 108 closest to the rims 104, the eyeglass frame 100 may comprise two locks elsewhere on the eyeglass frame 100 as a decorative extension such as in corners of a cat eye style of eyeglass frames. Similar to lock 118, each lock in a corner of the rims 104 opposite the bridge 102 may capture and close the split 116 in the rim 104 to contain and secure the lens 106 within the eyeglass frame 100 and open the split 116 in the rim 104 and release the lens 106.

Figure 2A:
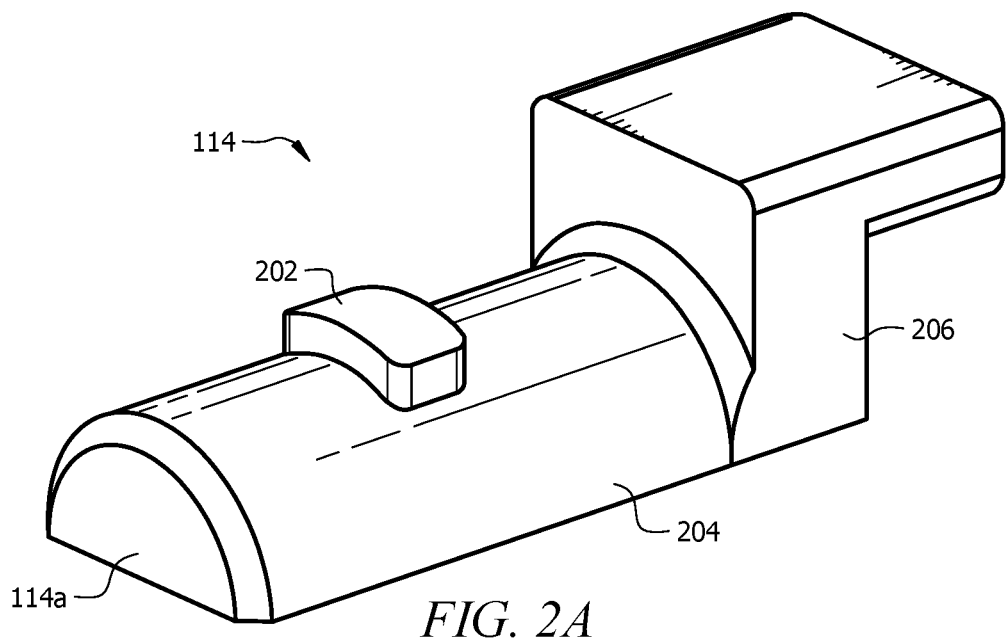
FIG. 2A is a perspective view of one portion of a split end piece according to an embodiment of the disclosure.
Figure 2B:
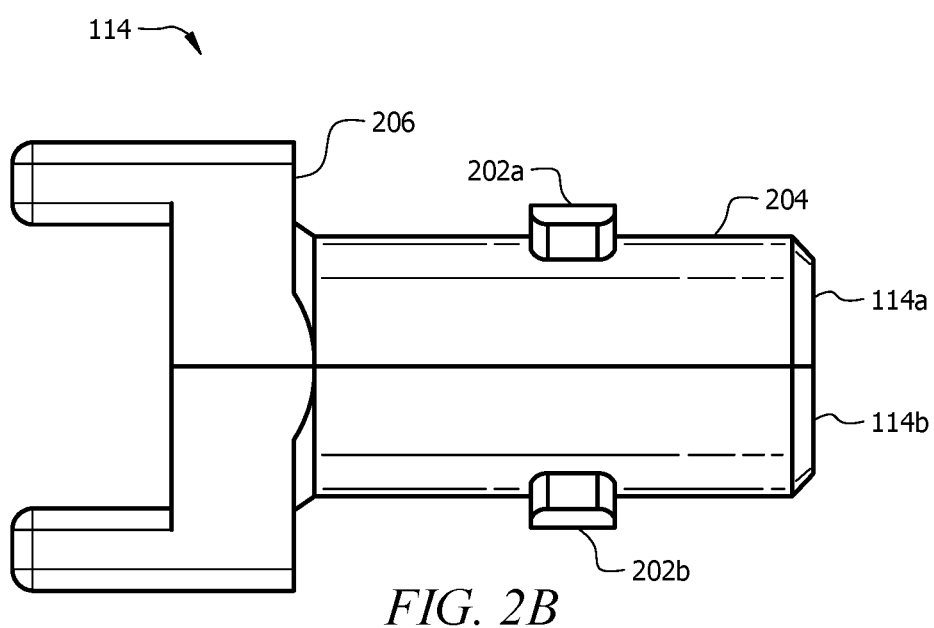
FIG. 2B is a side view of a split end piece according to an embodiment of the disclosure.

Turning now to FIGS. 2A and 2B, an embodiment of the spilt end piece 114 is illustrated. At least one of the first portion 114a or the second portion 114b may comprise a protrusion or a lug 202. A lug 202 as described further herein may be configured to travel through a channel and engage with a shoulder to create a retaining force.

In an embodiment, as illustrated in FIG. 2B, both the first portion 114a and the second portion 114b comprise a lug 202. For example, the first portion 114a may comprise a lug 202a on a top of the first portion 114a while the second portion 114b may comprise a lug 202b on a bottom of the second portion 114b. The lug 202 may be orthogonal in shape or curved. Each of the first portion 114a and the second portion 114b may comprise an exposed portion 204 and an end portion 206.

While illustrated in FIGS. 2A and 2B as being approximately centered on the exposed portion 204 of each split end piece 114, the lug 202 could be located closer to one of the ends of the split end piece 114 without departing from the spirit or scope of the present disclosure. In an embodiment, the exposed portion 204 may be semi-circular in shape. Alternatively, the exposed portion 204 may comprise a different shape.

The end portion 206 of each split end piece 114 may be disposed within the rim 104, and therefore not exposed. While illustrated in FIGS. 2A and 2B as being L shaped, the end portion 206 of each split end piece 114 may comprise a different shape without departing from the spirit or scope of the present disclosure.

Figure 3A:
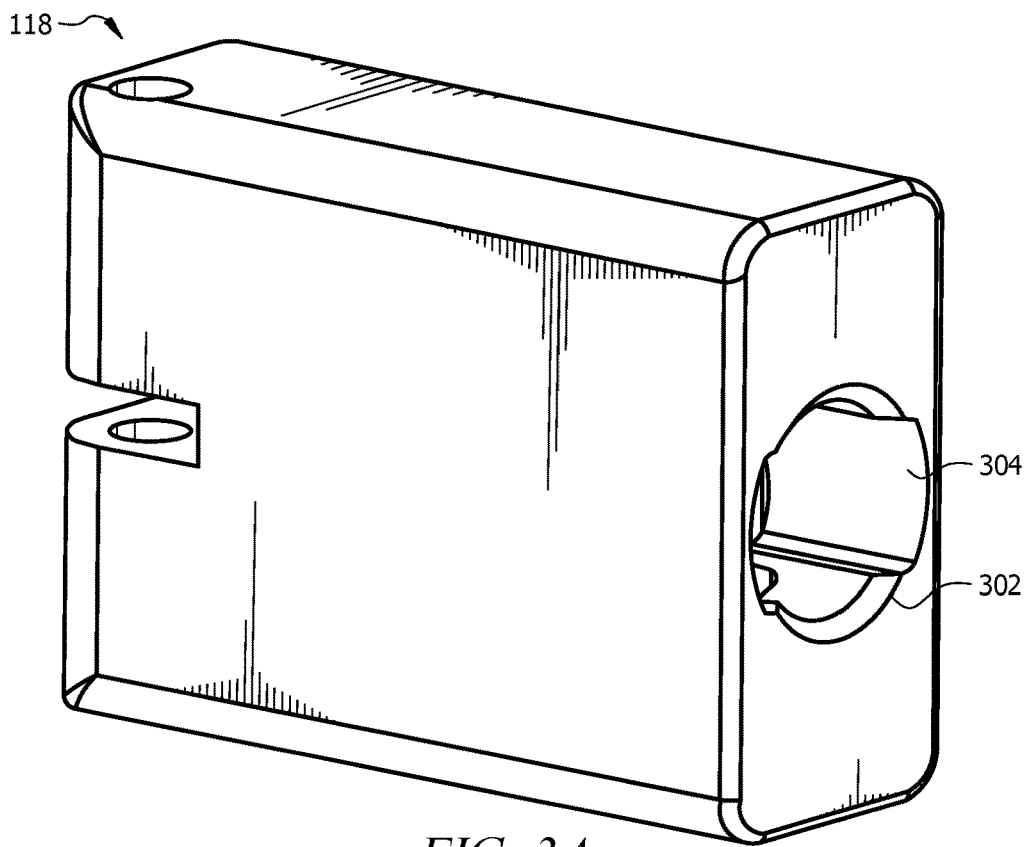
FIG. 3A is a perspective view of a lock according to an embodiment of the disclosure.
Figure 3B:
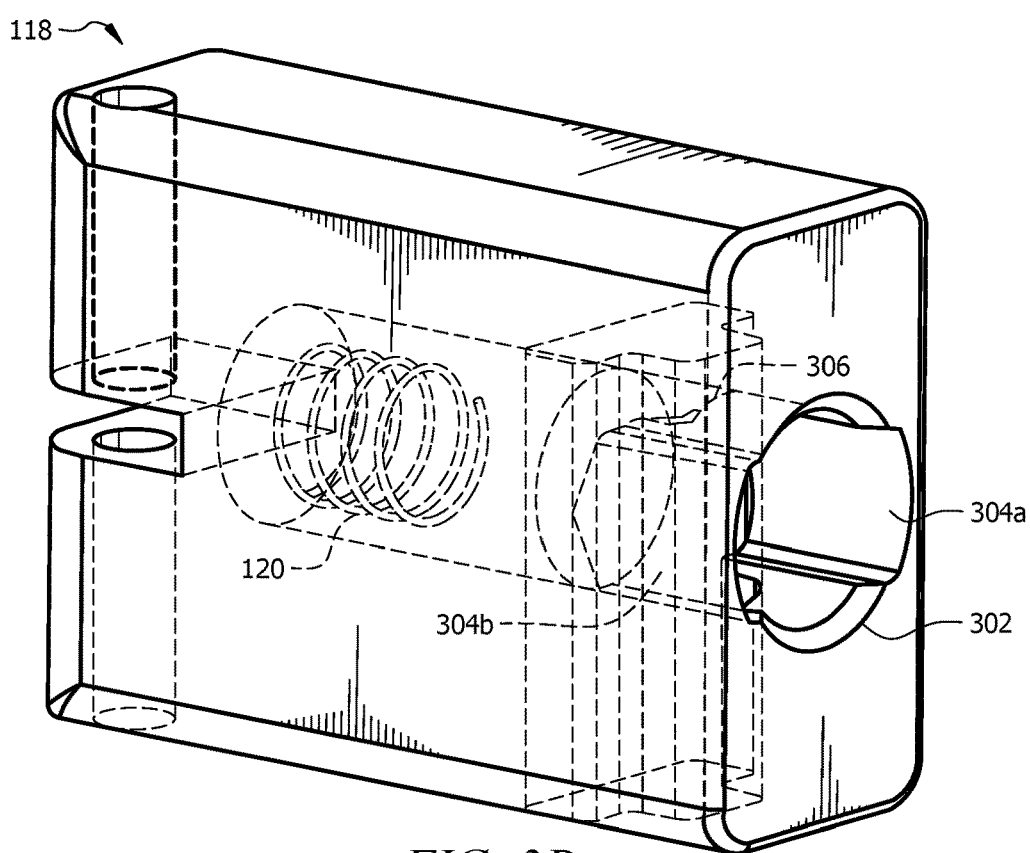
FIG. 3B is a perspective, ghosted view of a lock according to an embodiment of the disclosure.

Turning now to FIGS. 3A and 3B, an embodiment of the lock 118 is illustrated. In an embodiment, the lock 118 comprises a passageway 302 through which the split end piece 114 travels. The lock 118 may comprise at least one channel 304 defined by at least one surface of the lock 118. The at least one channel 304 may be configured to receive at least some of the first portion 114a or the second portion 114b of the split end piece 114. For example, the at least one channel 304 may receive the lug 202a of the first portion 114a or the lug 202b of the second portion 114b of the split end piece 114. The lock 118 may also comprise at least one shoulder 306 comprising a surface of the lock 118. The at least one shoulder 306 may be configured to receive and engage the lug 202. The at least one shoulder 306 may comprise an orthogonal shoulder profile. Alternatively, the at least one shoulder 306 may comprise a non-orthogonal shoulder profile, for example, to mate with a curved lug. While illustrated as being rectangular in shape, the lock 118 could comprise a different shape without departing from the spirit or scope of the present disclosure.

As illustrated in FIG. 3B, in an embodiment, the passageway 302 of the lock 118 comprises a pair of channels 304a and 304b beginning at an entrance of the lock 118 and defined by a plurality of surfaces of the lock 118. Each channel 304a, 304b may be configured to receive a corresponding lug 202a, 202b of a corresponding portion 114a, 114b of the split end piece 114. The spring 120 within the lock 118 may be configured to compress as the first portion 114a and the second portion 114b of the split end piece 114 are inserted into the lock 118 and each lug 202a, 202b is moved through a corresponding channel 304a, 304b toward a back of the lock 118.

Figure 4A:
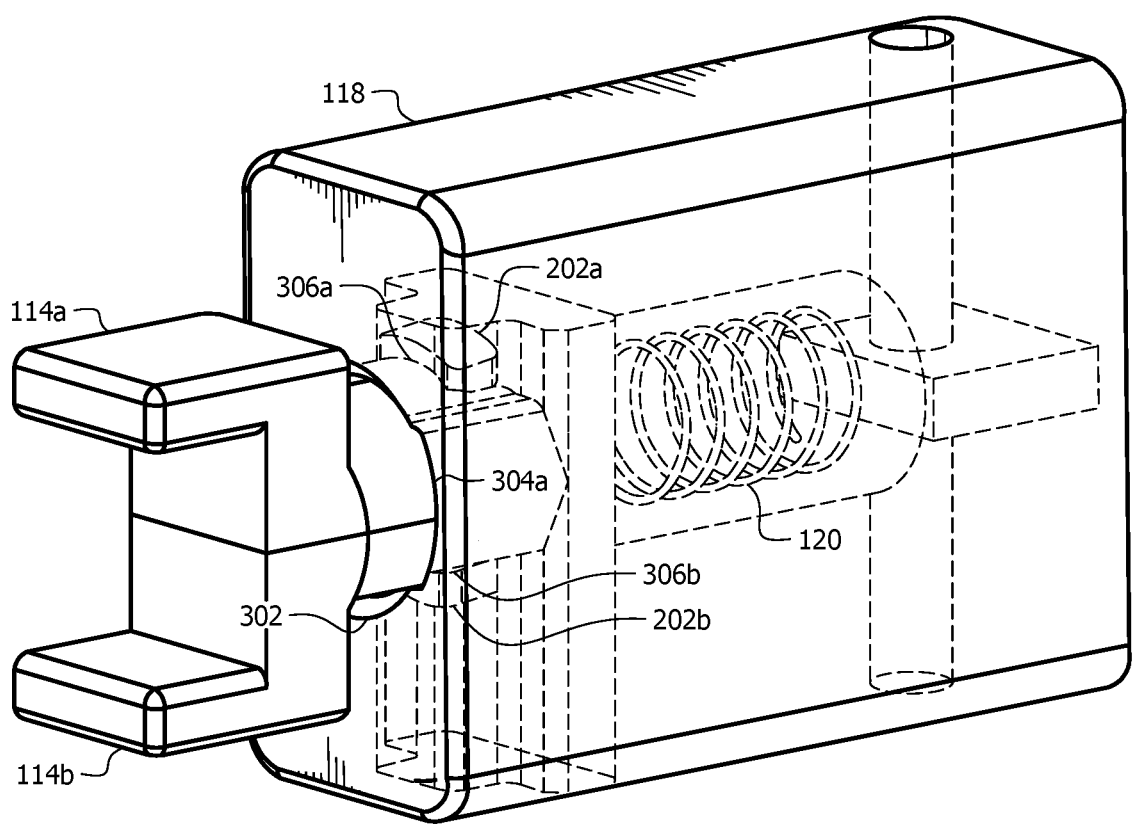
FIG. 4A is a perspective, ghosted view of a split end piece within a lock according to an embodiment of the disclosure.
Figure 4B:
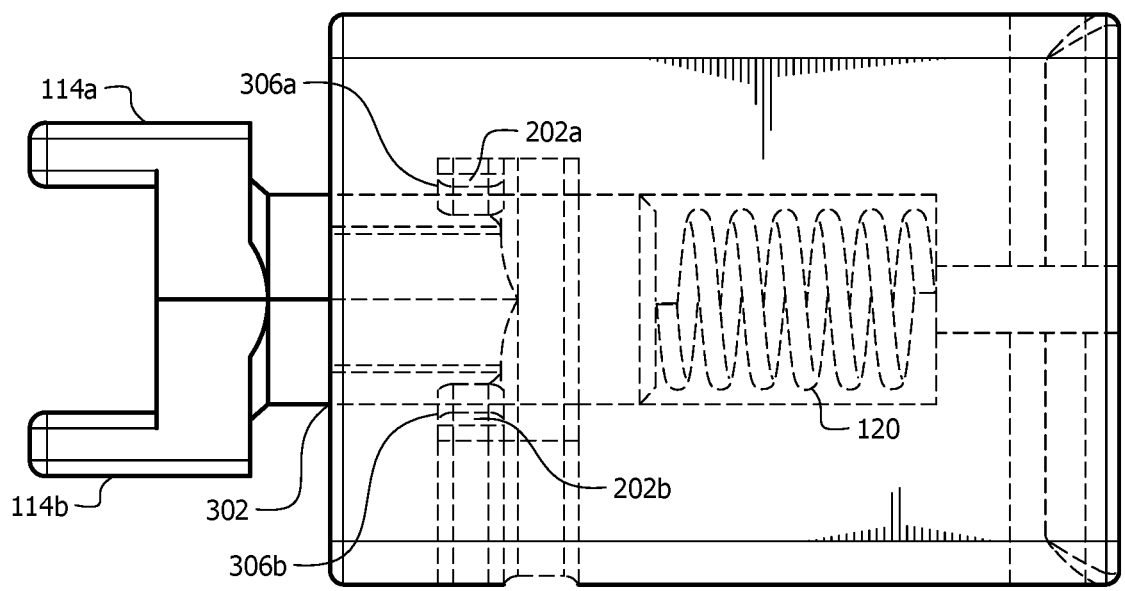
FIG. 4B is a side, ghosted view of a split end piece within a lock according to an embodiment of the disclosure.

With reference now to FIGS. 4A and 4B, an embodiment illustrating the split end piece 114 locked within the lock 118 is shown. In addition to a pair of channels 304a, 304b, the lock 118 may also comprise a pair of shoulders 306a, 306b toward the back of the lock 118. Each shoulder 306a, 306b may comprise a surface of the lock 118 and may be configured to receive and engage the corresponding lug 202a, 202b. The surface of each shoulder 306a, 306b may be adjacent to at least one of the plurality of surfaces defining the pair of channels 304a, 304b. In an embodiment, the surface of each shoulder 306a, 306b is approximately perpendicular to at least one of the plurality of surfaces defining the pair of channels 304a, 304b. For example, the surface of each shoulder 306a, 306b may be about 85 degrees to 95 degrees from at least one of the plurality of surfaces defining the pair of channels 304a, 304b.

To lock the split end piece 114 into the lock 118 and thereby secure the temple 108 to the rim 104 and secure the lens 106 within the rim 104, the split end piece 114 and/or the lock 118 may be rotated to align the lugs 202a, 202b with the pair of channels 304a, 304b. Once aligned, the split end piece 114 may be inserted into the passageway 302 and the lug 202a of the first portion 114a of the split end piece 114 may travel through one of the channels 304a, 304b and the lug 202b of the second portion 114b of the split end piece 114 may travel through the other of the channels 304a, 304b. As the first portion 114a and the second portion 114b of the split end piece 114 are inserted into the lock 118 and each lug 202a, 202b is moved through a corresponding channel 304a, 304b toward a back of the lock 118, the spring 120 may compress.

Once the lugs 202a, 202b reach the end of the pair of channels 304a, 304b, the split end piece 114 and/or the lock 118 may be rotated until the lugs 202a, 202b engage with the corresponding shoulder 306a, 306b. For example, in an embodiment, the split end piece 114 and/or the lock 118 are rotated approximately 90 degrees for the lugs 202a, 202b to engage with the shoulders 306a, 306b. Once engaged, the spring 120 may be released thereby securing the lugs 202a, 202b against the shoulders 306a, 306b and locking the split end piece 114 within the lock 118. With the split end piece 114 locked within the lock 118, the temple 108 is secured to the rim 104 and the lens 106 is secured within the rim 104.

Figure 5A:
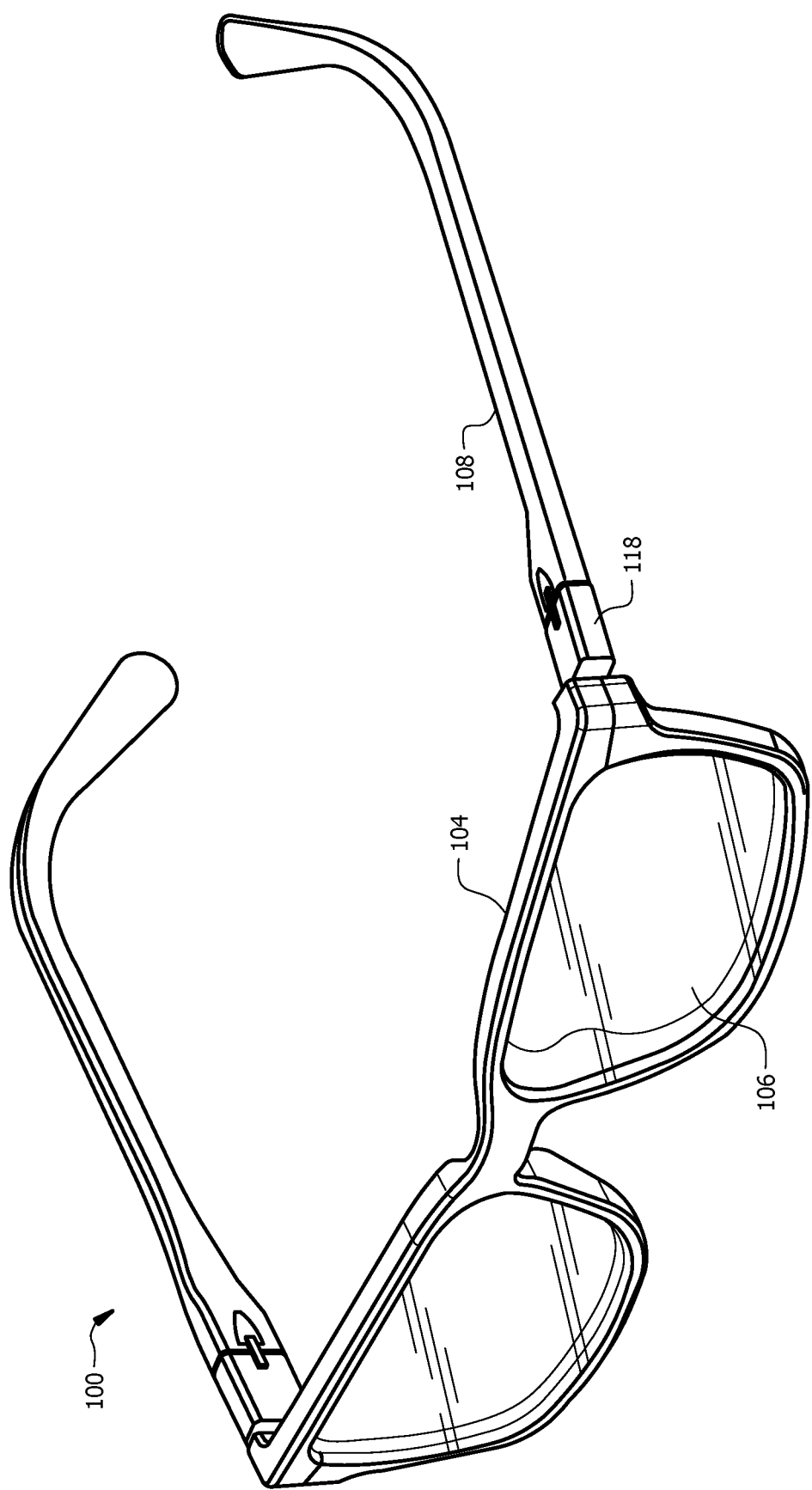
FIG. 5A is a perspective view of an eyeglass frame according to an embodiment of the disclosure.
Figure 5B:
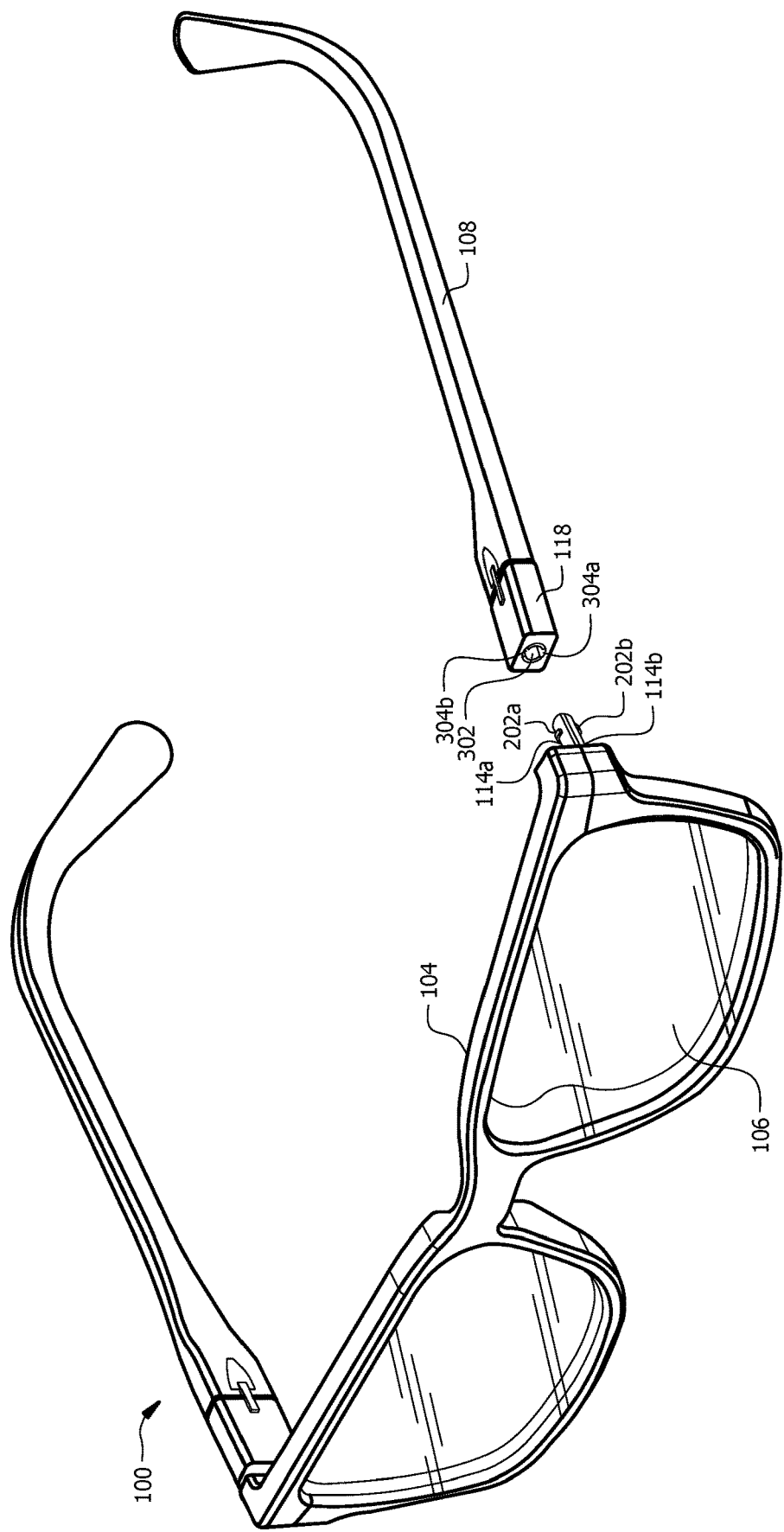
FIG. 5B is a perspective view of an eyeglass frame according to an embodiment of the disclosure.
Figure 5C:
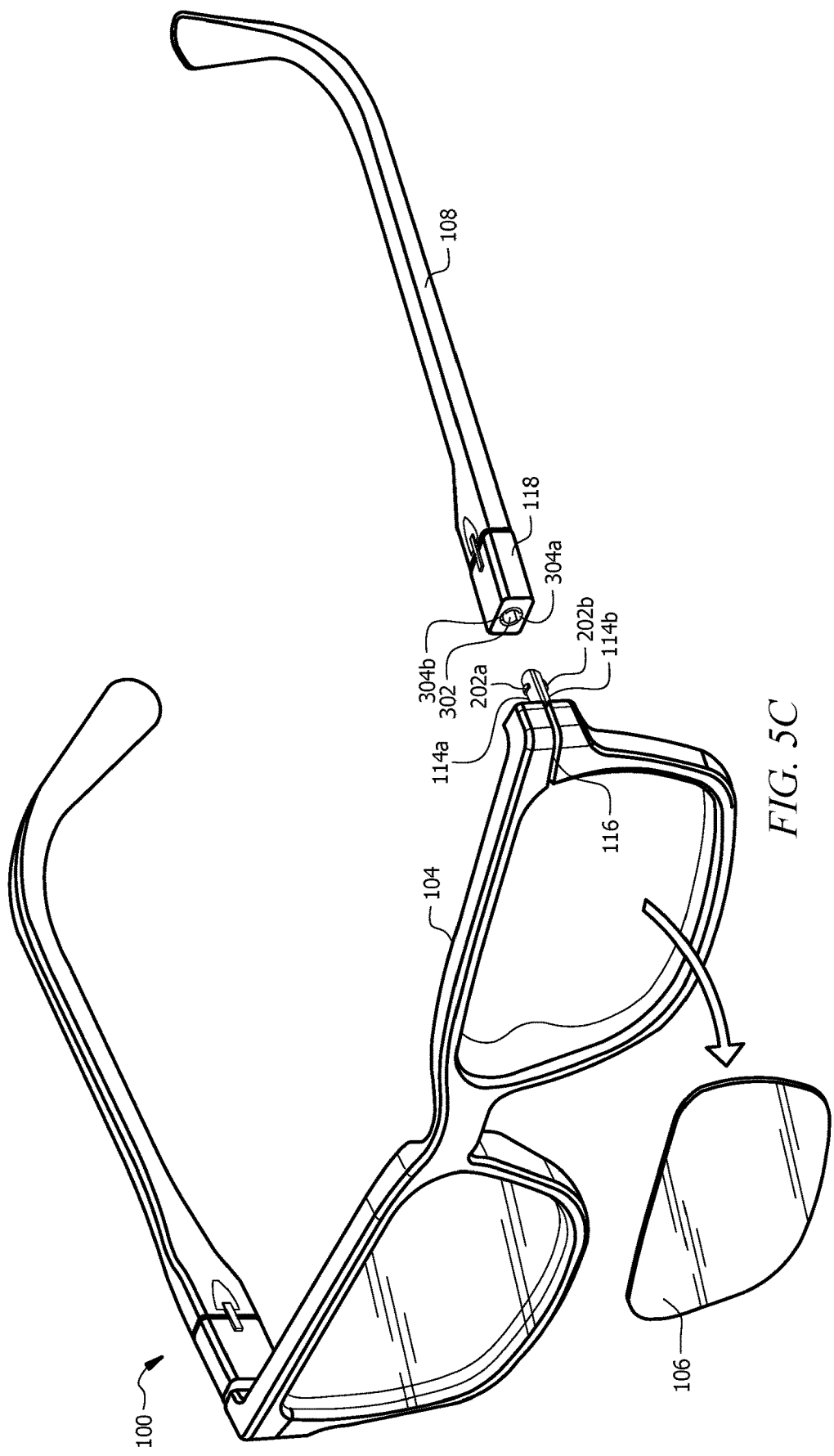
FIG. 5C is a perspective view of an eyeglass frame according to an embodiment of the disclosure.

Turning now to FIGS. 5A-5C, an embodiment of the eyeglass frame 100 is illustrated showing how to remove the lens 106 from the rim 104. In order to remove the lens 106 from the rim 104, the split end piece 114 has to be disengaged from within the lock 118. To disengage the split end piece 114 from within the lock 118, the temple 108 may be pushed toward the rim 104 to compress the spring 120 and disengage the lugs 202a, 202b from the shoulders 306a, 306b. Next, as illustrated in FIG. 5A, the temple 108 may be rotated until the lugs 202a, 202b align with the pair of channels 304a, 304b. In an embodiment, the temple 108 may be rotated approximately 90 degrees for the lugs 202a, 202b to move into the pair of channels 304a, 304b.

As illustrated in FIG. 5B, the split end piece 114 may be pulled out of the lock 118 by pulling the lugs 202a, 202b through the pair of channels 304a, 304b. Once the split end piece 114 is removed from the lock 118, the rim 104 may be opened at the split 116 as illustrated in FIG. 5C. For example, the rim 104 may be opened at the split 116 by separating the first portion 114a of the split end piece 114 from the second portion 114b of the split end piece 114. The lens 106 may then be removed from the rim 104. Once removed, the lenses 106 may be placed into a different eye glass frame. For example, the lenses may 106 may be placed into a different eyeglass frame similar to eyeglass frame 100 discussed above.

Figure 6A:
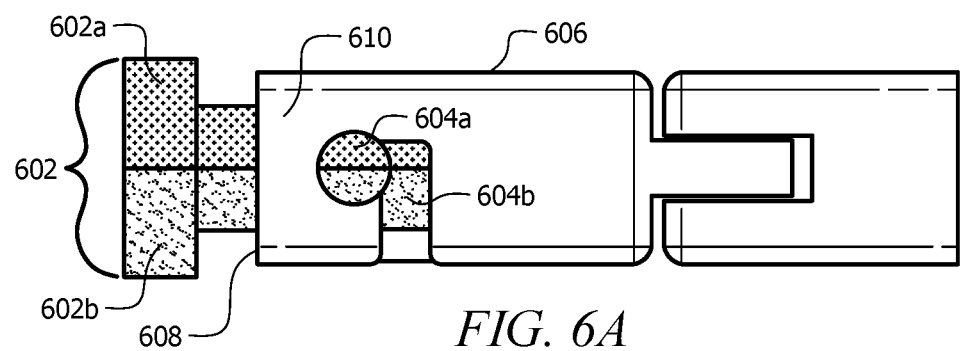
FIG. 6A is a side view of a split end piece within a lock according to an embodiment of the disclosure.
Figure 6B:
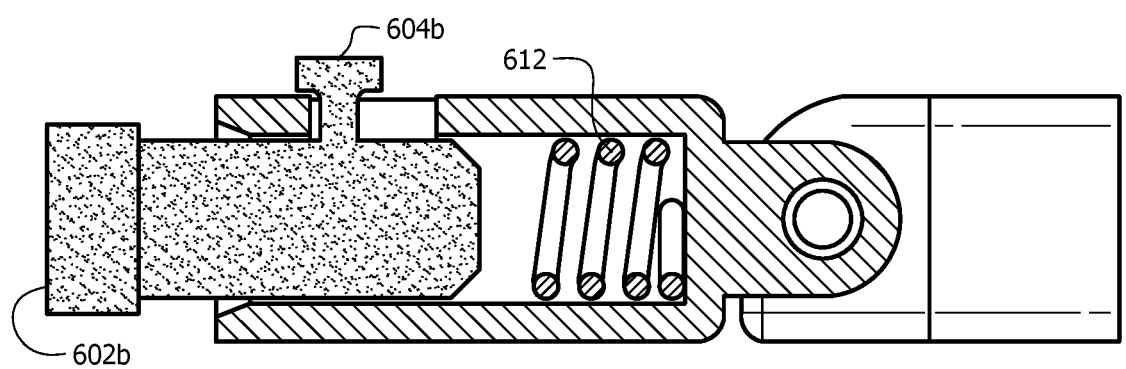
FIG. 6B is a bottom, ghosted view of a split end piece within a lock according to an embodiment of the disclosure.

Turning now to FIGS. 6A and 6B, an alternative embodiment for the split end piece and lock discussed above is provided. The split end piece 602 may comprise a first portion 602a and a second portion 602b. Each of the first portion 602a and the second portion 602 may comprise a lug 604a, 604b. The lugs 604a, 604a may be on the same side of first portion 602a and the second portion 602b of the split end piece 602 and positioned such that the lugs 604a, 604b align together to form a single lug.

The lock 606 may comprise a passageway 608 through which the split end piece 602 travels. The lock 606 may comprise at least one channel (not illustrated) defined by at least one surface of the lock 606. The at least one channel may be configured to receive at least some of the first portion 602a and the second portion 602b of the split end piece 602. For example, the at least one channel may receive the lugs 604a, 604b of the split end piece 602. The lock 606 may also comprise at least one shoulder 610 comprising a surface of the lock 606. The at least one shoulder 610 may be configured to receive and engage the lugs 604a, 604b.

The lock 606 may also comprise a spring 612. In an embodiment, the spring 612 is a compression spring. The spring 612 may be configured to compress as the first portion 602a and the second portion 602b of the split end piece 602 are inserted into the lock 606 and the lugs 604a, 604b are moved through the at least one channel toward a back of the lock 606. Once the lugs 604a, 604 reach the end of the at least one channel, the split end piece 602 and/or the temple 108 may be rotated to bring the lugs 604a, 604b within the shoulder 610. Once the lugs 604a, 604b are engaged with the shoulder 610, the spring 612 may be released thereby securing the lugs 604a, 604b against the shoulder 610 and locking the split end piece 602 within the lock 606. With the split end piece 602 locked within the lock 606, the temple 108 is secured to the rim 104 and the lens 106 is secured within the rim 104.

Figure 7A:
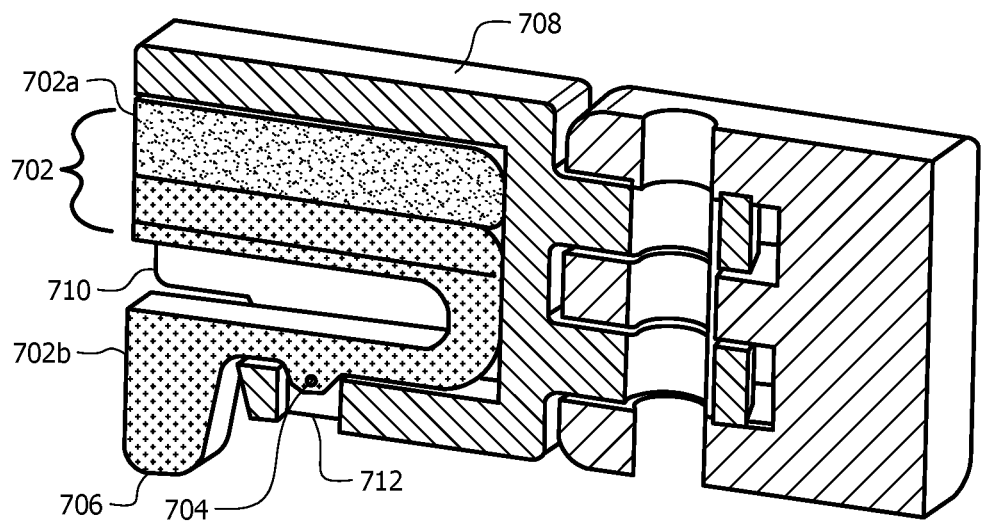
FIG. 7A is a perspective, cross-sectional view of a split end piece within a lock according to an embodiment of the disclosure.
Figure 7B:
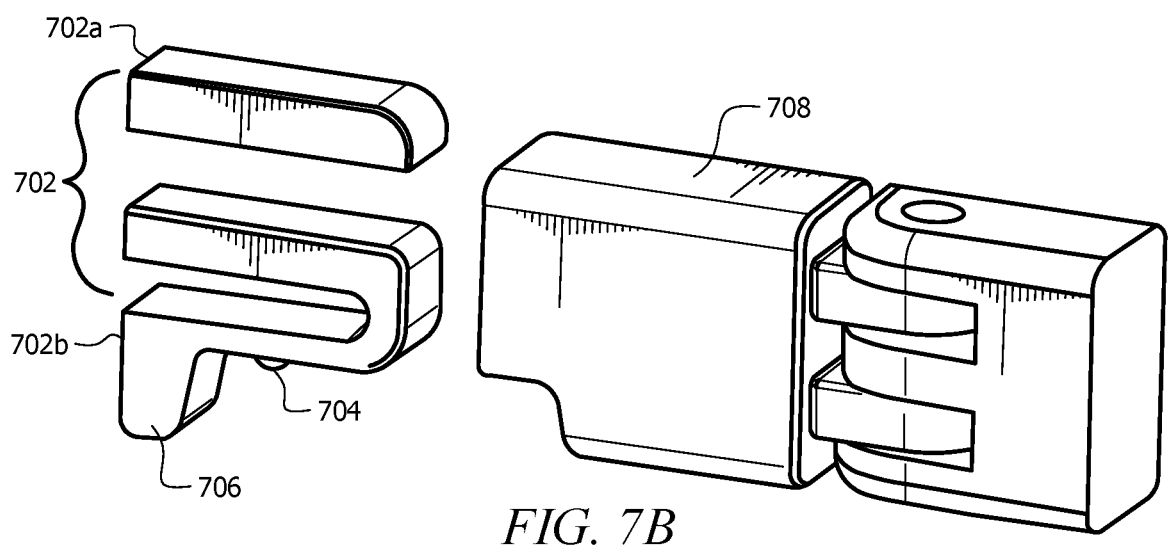
FIG. 7B is a perspective view of a split end piece and a lock according to an embodiment of the disclosure.

Turning now to FIGS. 7A and 7B, an alternative embodiment for the split end piece and lock discussed above is provided. The split end piece 702 may comprise a first portion 702a and a second portion 702b. The second portion 702b may comprise a lug 704. The second portion 702b may also comprise a tab 706.

The lock 708 may comprise at least one channel 710 defined by at least one surface of the lock 708. The at least one channel 710 be configured to receive at least some of the first portion 702a and the second portion 702b of the split end piece 702. The lock 708 may also comprise at least one shoulder 712 comprising a surface of the lock 708. The at least one shoulder 712 may be configured to receive and engage the lug 704. To remove the split end piece 702 from the lock 708, the tab 706 of the second portion 702a may be compressed toward the first portion 702a, thereby removing the lug 704a from the shoulder 712 and allowing the split end piece 702 to be pulled through the at least one channel 710 and out of the lock 708.

Figure 8A:
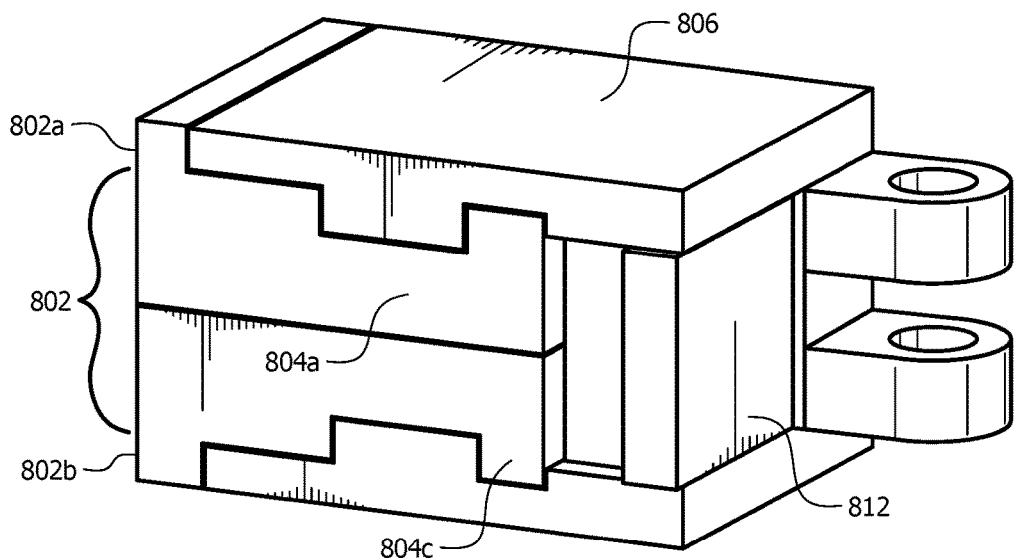
FIG. 8A is a perspective view of a split end piece within a lock according to an embodiment of the disclosure.
Figure 8B:
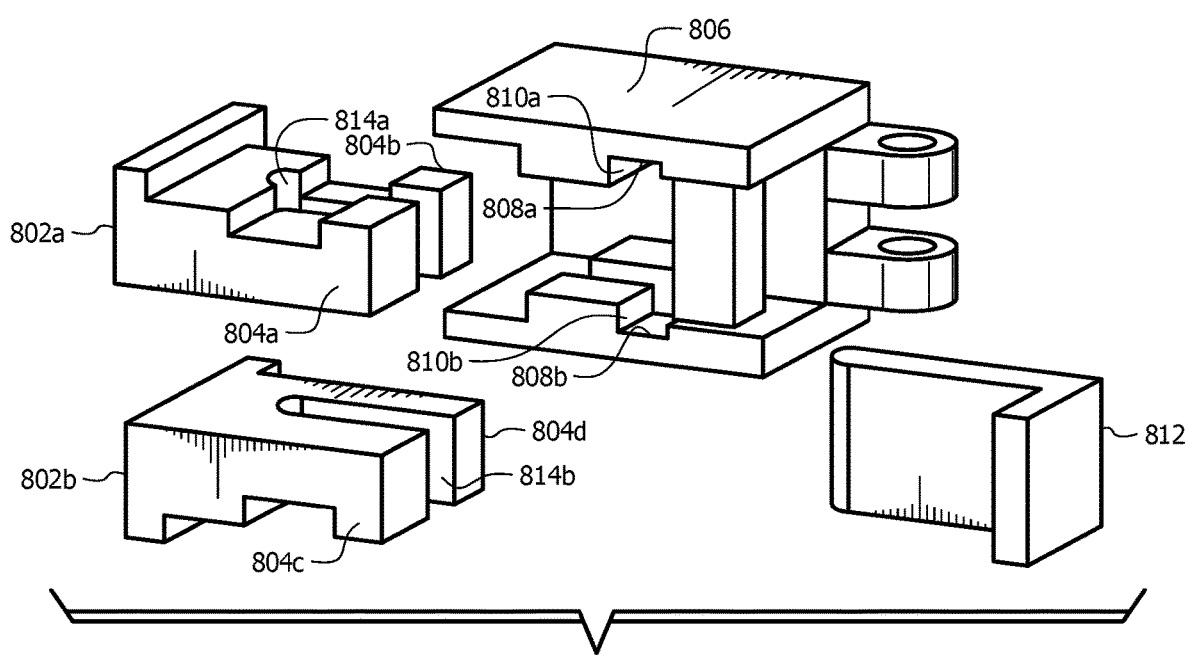
FIG. 8B is a perspective view of a split end piece and a lock according to an embodiment of the disclosure.

Turning now to FIGS. 8A and 8B, an alternative embodiment for the split end piece and lock discussed above is provided. The split end piece 802 may comprise a first portion 802a and a second portion 802b. The first portion 802a may comprise a first plurality of lugs 804a, 804b and the second portion 802b may comprise a second plurality of lugs 804c, 804d. The first portion 802a and the second portion 802b may be configured to slide into the lock 806 from the side. For example, the first plurality of lugs 804a, 804b may slide through a first channel 808a of the lock 806 and the second plurality of lugs 804c, 804d may slide through a second channel 808b of the lock 806.

The lock 806 may comprise a plurality of shoulders 810a, 810b comprising a plurality of surfaces of the lock 806. The first plurality of lugs 804a, 804b may be configured to engage with the first shoulder 810a while the second plurality of lugs 804c, 804d may be configured to engage with the second shoulder 810b. The lock 804 may also comprise a slide bar 812 that is configured to be pushed into the lock 806 and through splits 814a, 814b in the first portion 802a and the second portion 802b to secure the first portion 802a and the second portion 802b within the lock 806.

Figure 9A:
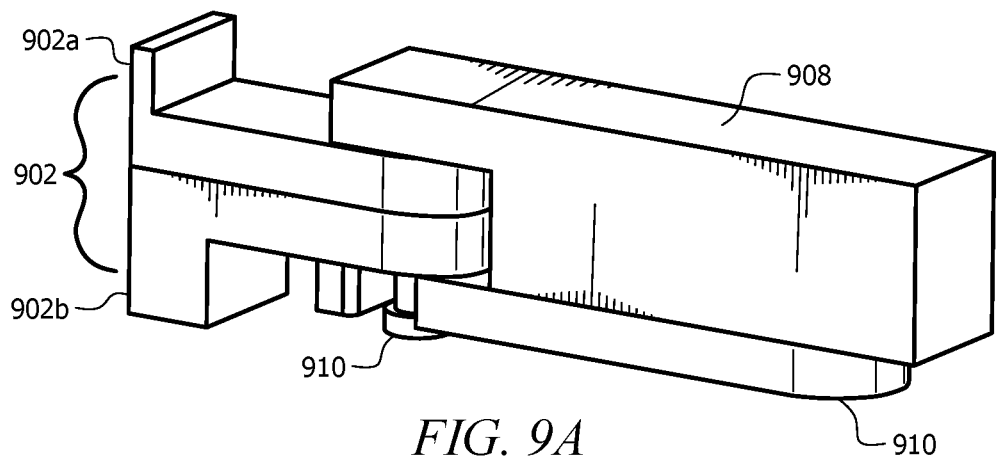
FIG. 9A is a perspective view of a split end piece within a lock according to an embodiment of the disclosure.
Figure 9B:
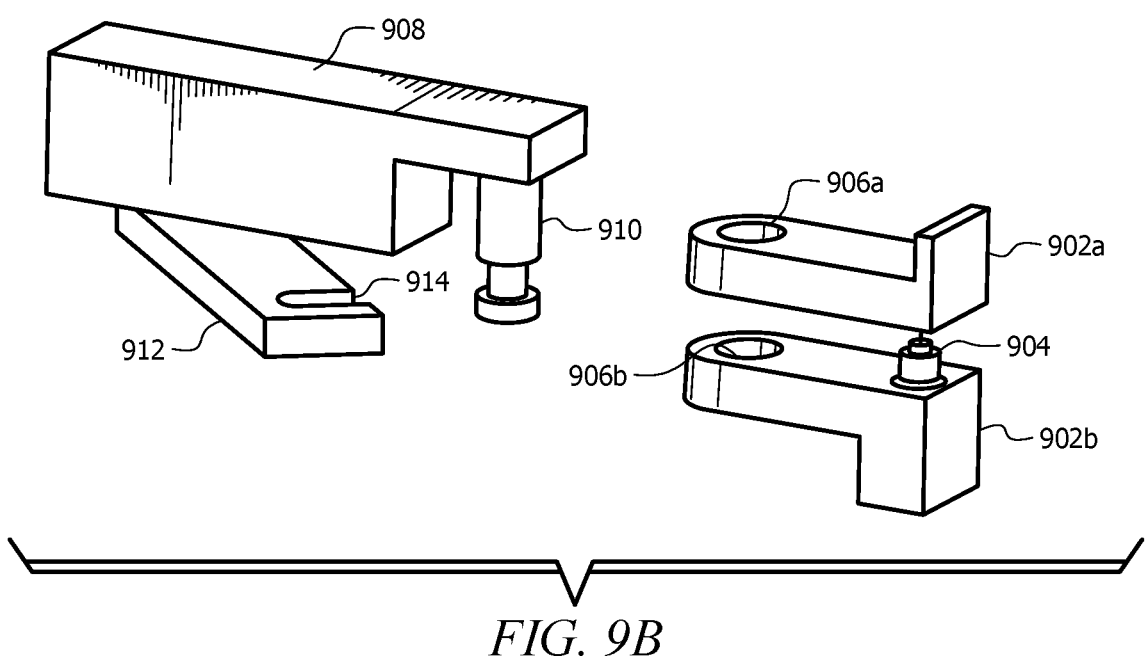
FIG. 9B is a perspective view of a split end piece and a lock according to an embodiment of the disclosure.

Turning now to FIGS. 9A and 9B, an alternative embodiment for the split end piece and lock discussed above is provided. The split end piece 902 may comprise a first portion 902a and a second portion 902b. The second portion 902b may comprise a lug 904 on a top of the second portion 902b. The lug 904 may be configured to be inserted into an opening (not illustrated) on a bottom side of the first portion 902a. The first portion 902a and the second portion 902b may comprise holes 906a, 906b.

The lock 908 may comprise a rod 910 configured to receive the holes 906a, 906b of the first portion 902a and the second portion 902b. The lock 908 may also comprise a member 912 that rotates and comprises an opening 914 that is configured to fit at least partially around the rod 910 to secure the first portion 902a and the second portion 902b on the rod 910.

Figure 10:
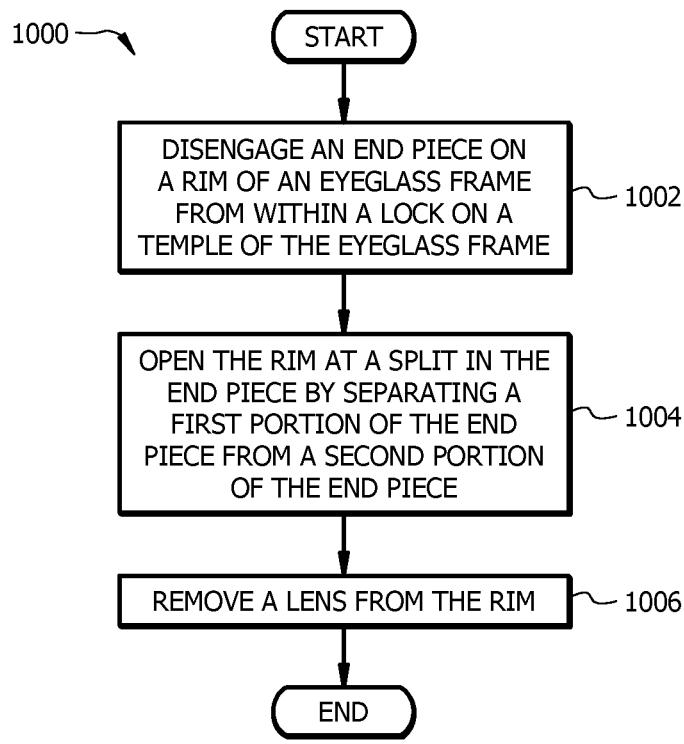
FIG. 10 is a flow chart of a method according to an embodiment of the disclosure.

Turning now to FIG. 10, a method for removing a lens from an eyeglass frame 1000 is described. At block 1002, an end piece on a rim of the eyeglass frame is disengaged from within a lock on a temple of the eyeglass frame. The disengaging may comprise rotating the end piece or the lock and/or moving the end piece or the lock at least one of laterally or vertically. The end piece may comprise a split resulting in a first portion of the end piece and a second portion of the end piece. At block 1004, the rim at the split in the end piece is opened by separating the first portion of the end piece from the second portion of the end piece. At block 1006, the lens is removed from the rim.

Figure 11:
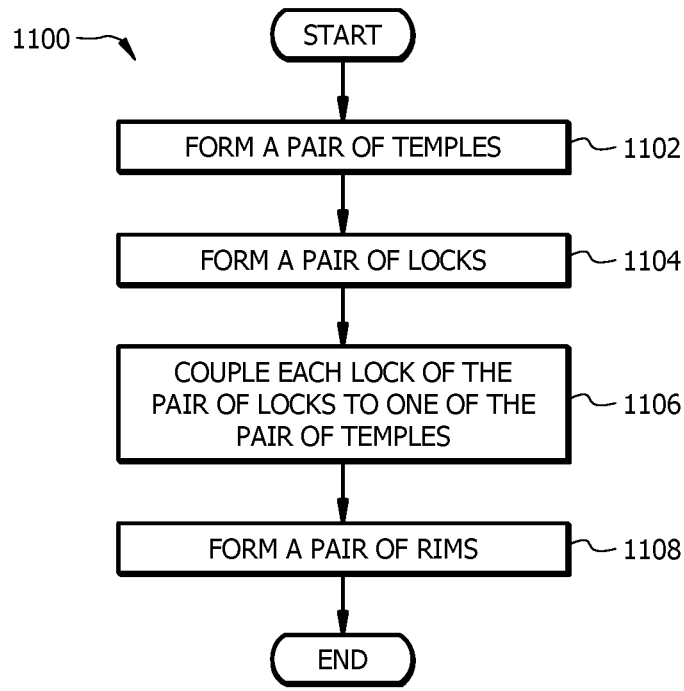
FIG. 11 is a flow chart of another method according to an embodiment of the disclosure.

Turning now to FIG. 11, a method of manufacturing eyeglass frames 1100 is described. At block 1102, a pair of temples is formed. At block 1104, a pair of locks is formed. At block 1106, each lock of the pair of locks is coupled to one of the pair of temples. At block 1108, a pair of rims is formed. Each rim of the pair of rims may comprise a split end piece that extends outward from the rim on a side of the rim opposite a bridge and at an intersection point with one of the pair of temples. The pair of rims may be formed such that each rim naturally opens at the split in the end piece when not coupled to a corresponding lock on a corresponding temple of the pair of temples. The eyeglass frames may be made of one or more materials that are formable with a memory or resilience to elastically respond towards an original state even after being locked in a different state for a period of time. For example, the eyeglass frames may be made of plastic or a different material.

Figure 12:
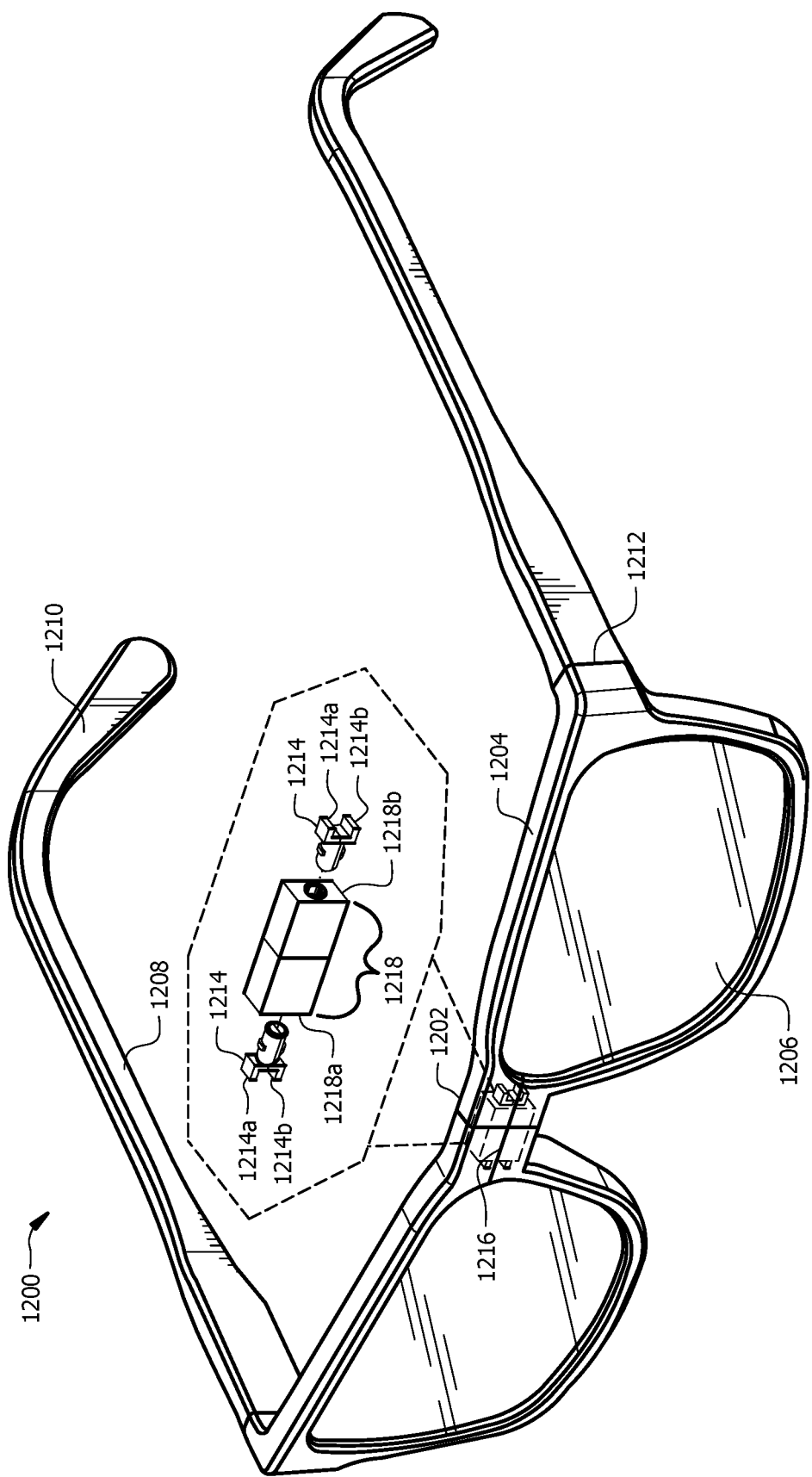
FIG. 12 is a perspective, ghosted view of an eyeglass frame according to an embodiment of the disclosure.

Turning now to FIG. 12, an embodiment of an eyeglass frame 1200 is illustrated. The eyeglass frame 1200 may be similar to the eyeglass frame 100 discussed above with respect to FIGS. 1A-1C. For example, in an embodiment, the eyeglass frame 1200 comprises a bridge 1202, two rims 1204, two lenses 1206, two temples 1208, two earpieces 1210, and two hinges 1212. The eyeglass frame 1200 may be made out of plastic, metal, wood, 3D printing compounds, or a different material.

The difference between eyeglass frame 100 and eyeglass frame 1200 is that eyeglass frame 1200 may comprise (1) two split pieces 1214 on a same side of the rim 1204 as the bridge 1202 as opposed to two split end pieces on a side of the rim 1204 opposite the bridge 1202 and (2) at least one lock 1218 on the bridge 1202 as opposed to a lock on each temple 1208. Each split piece 1214 may be coupled to and extend outward from one of the rims 1204 on a same side of the rim 1204 as the bridge 1202. Each of the split pieces 1214 may comprise a first portion 1214a and a second portion 1214b. Each rim 1204 on a same side as the bridge 1202 may comprise a horizontal split 1216 to allow removal of the lens 1206. In an embodiment, the first portion 1214a of the split piece 1214 is coupled to the rim 1204 on one side of the split 1216 while the second portion 1214b of the split piece 1214 is coupled to the rim 1204 on the other side of the split 1216. The split pieces 1214 may be formed together with the rims 1204 as part of the manufacturing processes. Alternatively, the split pieces 1214 may be coupled to the rims 1204 during or after the manufacturing process. The at least one lock 1218 on the bridge 1202 may be configured to at least partially contain both the first portion 1214a and the second portion 1214b of at least one of the two split pieces 1214 and secure the lens 1206 within the corresponding rim 1204.

In an embodiment, the bridge 1202 comprises two locks 1218a, 1218b. The first lock 1218a may be configured to at least partially contain both the first portion 1214a and the second portion 1214b of a first of the two split pieces 1214 and secure a first lens 1206 within a first of the two rims 1204 and the second lock 1218b may be configured to at least partially contain both the first portion 1214a and the second portion 1214b of a second of the two split pieces 1214 and secure a second lens 1206 within a second of the two rims 1204. In an embodiment, as illustrated in FIG. 12, the locks 1218a and 1218b are substantially similar to the locks 118 discussed above in FIGS. 3A, 3B, 4A, and 4B. In an alternative embodiment, when the at least one lock 1218 is on a same side as the bridge 1202, the lock may be mechanically simpler than locks 118. For example, the at least one lock 1218 may clasp over the first portion 1214a and the second portion 1214b of at least one of the two split pieces 1214. Also, while illustrated in FIG. 12 as two locks 1218a and 1218b, in an embodiment, there may be only a single lock on a same side as the bridge 1202 and that single lock may clasp over the first portion 1214a and the second portion 1214b of both of the two split pieces 1214.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An eyeglass frame, comprising:
   a bridge;
   two rims connected by the bridge, each rim configured to contain a lens;
   two split end pieces, each split end piece comprising a first portion and a second portion, and each split end piece coupled to and extending outward from a corresponding rim of the two rims on a side of the corresponding rim opposite the bridge; and
   two temples, each temple comprising a lock on an end of the temple, wherein the lock is configured to at least partially contain both the first portion and the second portion of the split end piece and secure the temple to the corresponding rim and secure the lens within the corresponding rim, and wherein the lock comprises:
      a passageway comprising a pair of channels beginning at an entrance of the lock and defined by a plurality of surfaces of the lock, each channel configured to receive a corresponding lug of a corresponding portion of the split end piece;
      a spring configured to compress as the first portion and the second portion of the split end piece are inserted into the lock and each lug is moved through a corresponding channel of the pair of channels toward a back of the lock; and
      a pair of shoulders toward the back of the lock, each shoulder comprising a surface of the lock, wherein each shoulder is configured to receive and engage the corresponding lug.

2. The eyeglass frame of claim 1, wherein at least one of the first portion or the second portion of the split end piece comprises a lug.

3. The eyeglass frame of claim 2, wherein the lock comprises:
   a passageway comprising at least one channel defined by at least one surface of the lock, wherein the at least one channel is configured to receive at least some of the at least one of the first portion or the second portion of the split end piece; and
   at least one shoulder comprising a surface of the lock, wherein the at least one shoulder is configured to receive and engage the lug.

4. The eyeglass frame of claim 1, wherein each of the two temples comprises a hinge.

5. The eyeglass frame of claim 4, wherein the hinge is at a back of the lock, and wherein the back of the lock is closest to an earpiece of the temple.

6. The eyeglass frame of claim 1, wherein each of the first portion and the second portion of the split end piece comprises a lug.

7. The eyeglass frame of claim 6, wherein the lug on the first portion of the split end piece is on a top of the first portion, and wherein the lug on the second portion of the split end piece is on a bottom of the second portion.

8. The eyeglass frame of claim 1, wherein the surface of each shoulder is adjacent to at least one of the plurality of surfaces defining the pair of channels.

9. The eyeglass frame of claim 1, wherein the surface of each shoulder is approximately perpendicular to at least one of the plurality of surfaces defining the pair of channels.

10. A method for removing a lens from an eyeglass frame, the method comprising:
disengaging an end piece on a rim of the eyeglass frame from within a lock on a temple of the eyeglass frame, wherein the end piece comprises a split resulting in a first portion of the end piece and a second portion of the end piece, wherein each of the first portion and the second portion of the end piece comprises a lug, wherein the lock comprises at least one passageway comprising a pair of channels beginning at an entrance of the lock, a spring, and a pair of shoulders toward the back of the lock, and wherein the disengaging comprises:
pushing and rotating the end piece or the lock and moving each lug from a corresponding shoulder of the pair of shoulders into a corresponding channel of the pair of channels; and
subsequently pulling the end piece out of the lock by pulling each lug through the corresponding channel toward the entrance of the lock;
opening the rim at the split in the end piece by separating the first portion of the end piece from the second portion of the end piece; and
removing the lens from the rim.

11. The method of claim 10, wherein the end piece or the lock is rotated approximately ninety degrees to move each lug from the corresponding shoulder into the corresponding channel.

12. An eyeglass frame, comprising:
a bridge;
two rims connected by the bridge, each rim configured to contain a lens;
two temples, each temple configured to couple to one of the two rims;
two split pieces, each split piece comprising a first portion and a second portion, and each split piece coupled to and extending outward from a corresponding rim of the two rims on a same side of the corresponding rim as the bridge; and
at least one lock on the bridge, wherein the at least one lock is configured to at least partially contain both the first portion and the second portion of at least one of the two split pieces and secure the lens within the corresponding rim, wherein the at least one lock comprises:
a passageway comprising a pair of channels beginning at an entrance of the lock and defined by a plurality of surfaces of the lock, each channel configured to receive a corresponding lug of a corresponding portion of the at least one of the two split end pieces;
a spring configured to compress as the first portion and the second portion of the at least one of the two split end pieces are inserted into the lock and each lug is moved through a corresponding channel of the pair of channels toward a back of the lock; and
a pair of shoulders toward the back of the lock, each shoulder comprising a surface of the lock, wherein each shoulder is configured to receive and engage the corresponding lug.

13. The eyeglass frame of claim 12, wherein the bridge comprises two locks, wherein a first of the two locks is configured to at least partially contain both the first portion and the second portion of a first of the two split pieces and secure the lens within a first of the two rims, and wherein a second of the two locks is configured to at least partially contain both the first portion and the second portion of a second of the two split pieces and secure the lens within a second of the two rims.

* * * * *